US008406149B1

(12) United States Patent
Bolot (10) Patent No.: US 8,406,149 B1
(45) Date of Patent: Mar. 26, 2013

(54) METHOD AND SYSTEM FOR THE IDENTIFICATION OF POTENTIAL INTERNET SERVICE CUSTOMERS

(75) Inventor: Jean C. Bolot, Mountain View, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 695 days.

(21) Appl. No.: 12/201,483

(22) Filed: Aug. 29, 2008

(51) Int. Cl.
*H04L 12/56* (2006.01)
(52) U.S. Cl. ......... 370/253; 370/232; 370/252; 370/230
(58) Field of Classification Search .................. None
See application file for complete search history.

(56) References Cited

U.S. PATENT DOCUMENTS

| 5,933,490 | A | * | 8/1999 | White et al. | 379/221.01 |
| 6,904,461 | B1 | * | 6/2005 | Randhava et al. | 709/224 |
| 2002/0186239 | A1 | * | 12/2002 | Komuro | 345/738 |
| 2006/0165009 | A1 | * | 7/2006 | Nguyen et al. | 370/252 |

OTHER PUBLICATIONS

"Making Sense of Broadband Performance : Never Mind the Connection Speed, Measure the Connection Quality!," 2007, Visualware,<<http://www.myconnectionserver.com/whitepapers/connection_quality.pdf>>.*
Netscout, "Network Capacity Planning," netscout.com, Aug. 29, 2008, 2 pages, http://www.netscout.com/solutions/pm_capacity_planning.asp.
Netscout, "Network General Acquisition," netscout.com, Aug. 29, 2008, 2 pages, http://www.netscout.com/company/acquisition.asp.
Netscout, "nGENIUS Performance Manager," netscout.com, Jan. 19, 2007, 4 pages, Netscout Systems, Inc., Westford, Massachusetts.
Netscout, "Sniffer+nGenius Products," netscout.com, Mar. 24, 2008, 2 pages, http://www.netscout.com/products/default.asp.
Sonicwall, "SonicOS Standard 3.1 Administrator's Guide," Mar. 2005, 358 pages, Sonic WALL, Inc., Sunnyvale, California.

\* cited by examiner

*Primary Examiner* — Huy D Vu
*Assistant Examiner* — Zewdu A Beyen (57) ABSTRACT

A method for the identification of potential internet service customers is provided. The method includes receiving a first internet traffic data for an internet entity corresponding to a first amount of internet traffic exchanged with the internet entity over a first service provider network. The method also includes receiving a second internet traffic data for the internet entity corresponding to a second amount of internet traffic exchanged with the internet entity over a second service provider network. The method also includes determining a volume metric for the internet entity based at least in part on the first and second internet traffic data, determining whether the volume metric meets a criterion, and displaying an identity of the internet entity if the volume metric meets the criterion.

19 Claims, 6 Drawing Sheets

METHOD AND SYSTEM FOR THE IDENTIFICATION OF POTENTIAL INTERNET SERVICE CUSTOMERS

TECHNICAL BACKGROUND

The Internet includes a large number of computer networks connected to each other such that messages contained in internet protocol (IP) packets are transferred from a source computer to a destination computer through any number of different computer networks. Each of these computer networks may be operated by different internet service providers (ISPs).

A large volume of traffic traversing any given network may have sources or destinations outside of the network. For example, a network hosting a popular web site may receive a large number of web site hits from computer systems hosted within a competing network. The competing network may expend a large amount of bandwidth servicing the web site that it does not host. Additional bandwidth may be expended by a network servicing file transfers or email to and from private networks, file systems, or computer systems hosted on a different network.

OVERVIEW

A method for the identification of potential internet service customers is provided. The method includes receiving a first internet traffic data for an internet entity corresponding to a first amount of internet traffic exchanged with the internet entity over a first service provider network. The method also includes receiving a second internet traffic data for the internet entity corresponding to a second amount of internet traffic exchanged with the internet entity over a second service provider network. The method further includes determining a volume metric for the internet entity based at least in part on the first and second internet traffic data, determining whether the volume metric meets a criterion, and displaying an identity of the internet entity if the volume metric meets the criterion.

A computer-readable medium having instructions stored thereon for operating a computer system is provided. The instructions, when executed by the computer system, direct the computer system to receive a first internet traffic data for an internet entity corresponding to a first amount of internet traffic exchanged with the internet entity over a first service provider network. The instructions also direct the computer system to receive a second internet traffic data for the internet entity corresponding to a second amount of internet traffic exchanged with the internet entity over a second service provider network. The instructions further direct the computer system to determine a volume metric for the internet entity based at least in part on the first and second internet traffic data, determine whether the volume metric meets a criterion, and display an identity of the internet entity if the volume metric meets the criterion.

A computer system comprising a communication interface configured to receive internet traffic data, and a processing system coupled with the communication interface is provided. The processing system is configured to receive a first internet traffic data for an internet entity corresponding to a first amount of internet traffic exchanged with the internet entity over a first service provider network through the communication interface. The processing system is also configured to receive a second internet traffic data for the internet entity corresponding to a second amount of internet traffic exchanged with the internet entity over a second service provider network through the communication interface. The processing system is further configured to determine a volume metric for the internet entity based at least in part on the first and second internet traffic data, determine whether the volume metric meets a criterion, and display an identity of the internet entity if the volume metric meets the criterion.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

Figure 1:
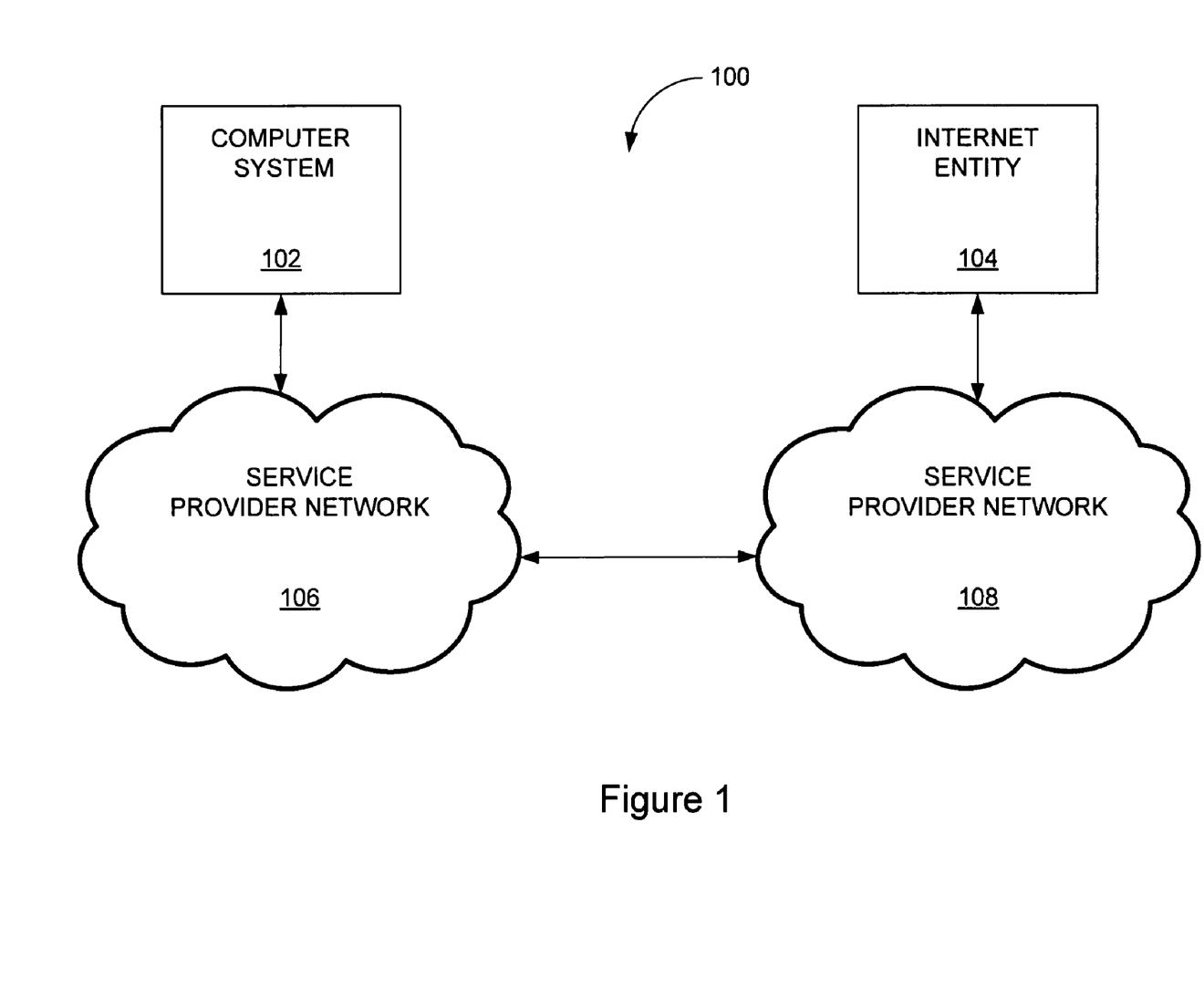
FIG. 1 is a block diagram illustrating a computer network and computer system configured for the identification of potential internet service customers.

FIG. 1 is a block diagram illustrating a computer network and computer system configured for the identification of potential internet service customers. In this example embodiment a computer network includes first service provider network 106 and second service provider network 108. Computer system 102 is connected to service provider network 106, and internet entity 104 is connected to service provider network 108. The service provider networks 106 and 108 are serviced and maintained by different internet service providers (ISPs). Service provider network 106 may be operated by a first ISP, and service provider network 108 may be operated by a second ISP.

In some cases, a substantial amount of internet traffic destined to, or sent from internet entity 104 may traverse service provider network 106. For example, if internet entity 104 is a popular website, a substantial number of web hits may originate from computer systems connected to service provider network 106. If the first internet service provider (ISP) is providing substantial bandwidth to their customers accessing internet entity 104, it may be advantageous to the first ISP to host internet entity 104 on service provider network 106. In this example, if a substantial fraction of the hits to internet entity 104 originate from systems connected to service provider network 106, the first ISP may offer the owner of internet entity 104 an opportunity to move over to service provider network 106. This allows the first ISP to gain a large customer with a relatively small increase in utilized bandwidth within service provider network 106.

Computer system 102 is configured to identify such potential internet service customers by analyzing internet traffic data which may be publicly available (such as web hits to a web site), or internet traffic data which may be privately gathered by the first ISP within service provider network 106. This internet traffic data may take any of a wide variety of forms such as, web hits, home page web hits, volume of traffic, quantity of internet protocol (IP) packets sent or received, or similar data. This internet traffic data may then be used to produce an internet volume metric representing how much of the total traffic associated with internet entity 104 traverses service provider network 106. This internet volume metric may then be compared to a criterion such that only internet entities that the first ISP would find advantageous to add as customers will meet the criterion. This allows the first ISP to focus only on those internet entities that will be of most value as new customers.

Figure 2:
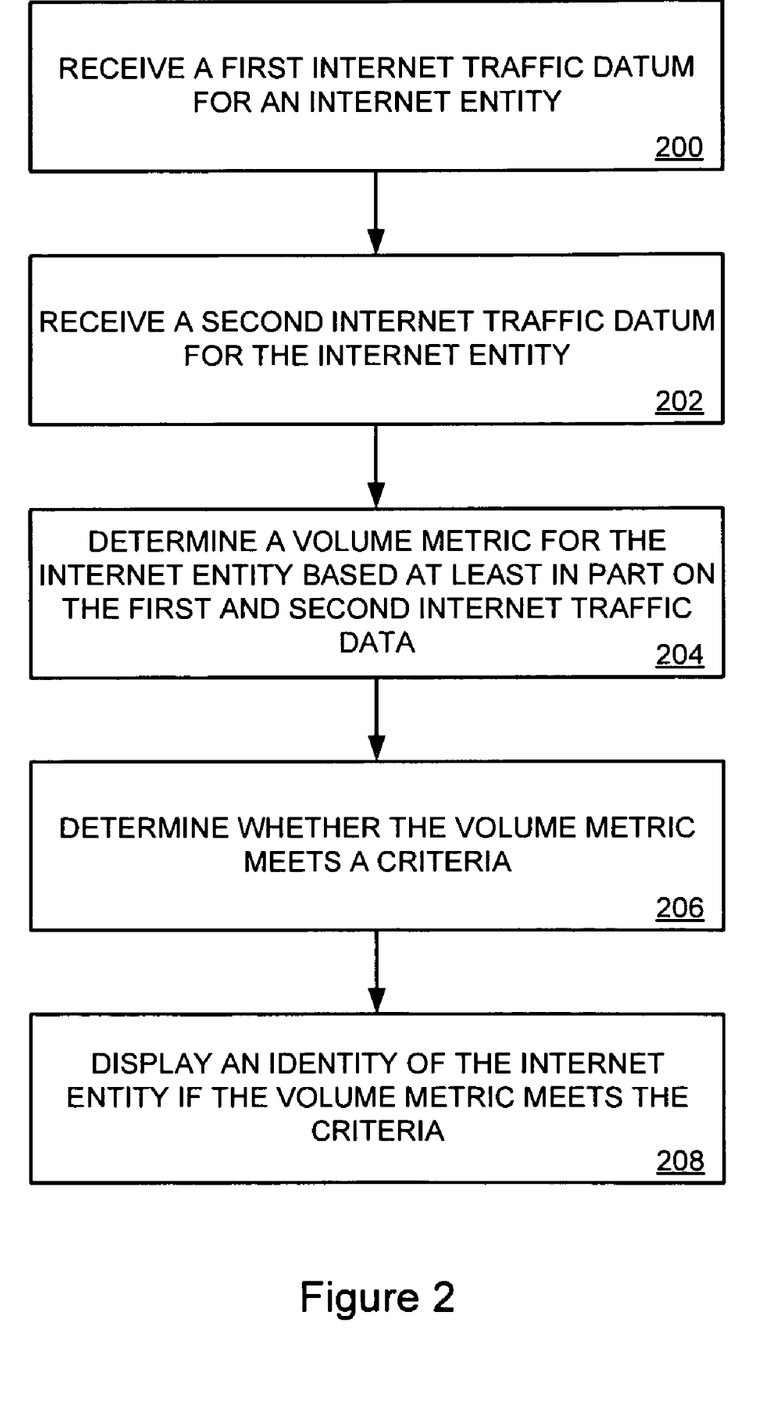
FIG. 2 is a flow chart illustrating a method for the identification of potential internet service customers.

FIG. 2 is a flow chart illustrating a method for the identification of potential internet service customers. Reference numbers from FIG. 2 are indicated parenthetically below. Computer system 102 receives a first internet traffic data for an internet entity 104 corresponding to a first amount of internet traffic exchanged with the internet entity over service provider network 106 (operation 200). This first internet traffic data may take any of a wide variety of formats depending on the type of internet entity being analyzed. For example, if internet entity 104 is a web site, the first internet traffic data may be a number of hits to that web site originating from computer systems connected to service provider network 106. This data may be obtained in any of a wide variety of ways. For example, service provider network 106 may contain hardware, firmware, or software configured to examine IP packets leaving service provider network 106 to determine how many packets have a destination address corresponding to internet entity 104 and a source address corresponding to a computer system within service provider network 106. Other examples may count only web site hits to the base page of a web site of interest.

Computer system 102 also receives a second internet traffic data for the internet entity corresponding to a second amount of internet traffic exchanged with the internet entity over service provider network 108 (operation 202). This second internet traffic data may take any of a wide variety of formats depending on the type of internet entity being analyzed. For example, if internet entity 104 is a web site, second internet traffic data may be a total number of hits to that web site. While the first ISP may not have access to detailed internet traffic data for service provider network 108 with respect to internet entity 104, this data may still be obtained in any of a wide variety of ways. For example, many web sites include a hit counter publicly displaying the total number of hits that the web site or page has received. Other web sites publicly display the number of hits that have been received in any given month, or other period of time. Other internet traffic data may be publicly available from a wide variety of sources such as ranking sites, search sites, business publications, and the like.

Computer system 102 determines a volume metric for internet entity 104 based at least in part of the first and second internet traffic data received in operations 200 and 202 (operation 204). This volume metric may be determined in any of a wide variety of ways. For example, a fraction of total web hits to a web site may be calculated by dividing the number of web hits originating from systems within service provider network 106 by the total number of web hits received by internet entity 104.

Computer system 102 determines whether or not the volume metric determined in operation 204 meets a criterion (operation 206). The criterion may be set in any of a wide variety of ways. For example, the criterion may be set as a fraction of web hits originating from systems within service provider network 106, such as 40%. In such an example, volume metrics greater than or equal to 40% would meet the criterion. The criterion may be set such that only internet entities which would be valuable new customers to the first ISP (provider of service provider network 106) meet the criterion. This operation acts as a filter to remove non-profitable or marginally profitable internet entities from consideration for a discounted offer of service.

Computer system 102 displays an identity of the internet entity 104 if the volume metric meets or exceeds the criterion (operation 208). This identity allows the first ISP to contact the owner or operator of internet entity 104 with an offer for service on service provider network 106.

In some embodiments, the first ISP may decide to offer a discount to potential customers based on the volume metric described above. For example, when the volume metric meets the criterion, a 10% discount may be offered to the potential customer, while in other cases where the volume metric exceeds the criterion, a larger discount may be offered to the potential customer. More than one criterion may be used within this method with the various criteria corresponding to various discounts.

Figure 3:
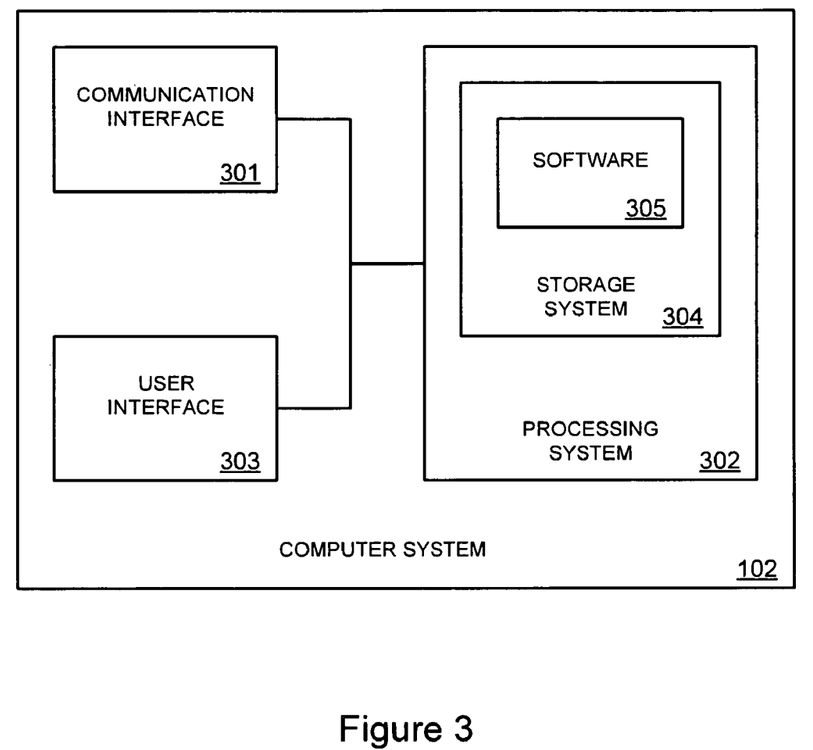
FIG. 3 is a block diagram illustrating a computer system configured for the identification of potential internet service customers.

FIG. 3 is a block diagram illustrating a computer system configured for the identification of potential internet service customers. Computer system 102 includes communication interface 301, processing system 302, and user interface 303. Processing system 302 includes storage system 304. Storage system 304 stores software 305. Processing system 302 is linked to communication interface 301 and user interface 303. Computer system 102 could be comprised of a programmed general-purpose computer, although those skilled in the art will appreciate that programmable or special purpose circuitry and equipment may be used. Computer system 102 may be distributed among multiple devices that together comprise elements 301-305.

Communication interface 301 could comprise a network interface, modem, port, transceiver, or some other communication device. Communication interface 301 may be distributed among multiple communication devices. Processing system 302 could comprise a computer microprocessor, logic circuit, or some other processing device. Processing system 302 may be distributed among multiple processing devices. User interface 303 could comprise a keyboard, mouse, voice recognition interface, microphone and speakers, graphical display, touch screen, or some other type of user device. User interface 303 may be distributed among multiple user devices. Storage system 304 could comprise a disk, tape, integrated circuit, server, or some other memory device. Storage system 304 may be distributed among multiple memory devices.

Processing system 302 retrieves and executes software 305 from storage system 304. Software 305 may comprise an operating system, utilities, drivers, networking software, and other software typically loaded onto a computer system. Software 305 could comprise an application program, firmware, or some other form of machine-readable processing instructions. When executed by processing system 302, software 305 directs processing system 302 to operate as described herein.

Figure 4:
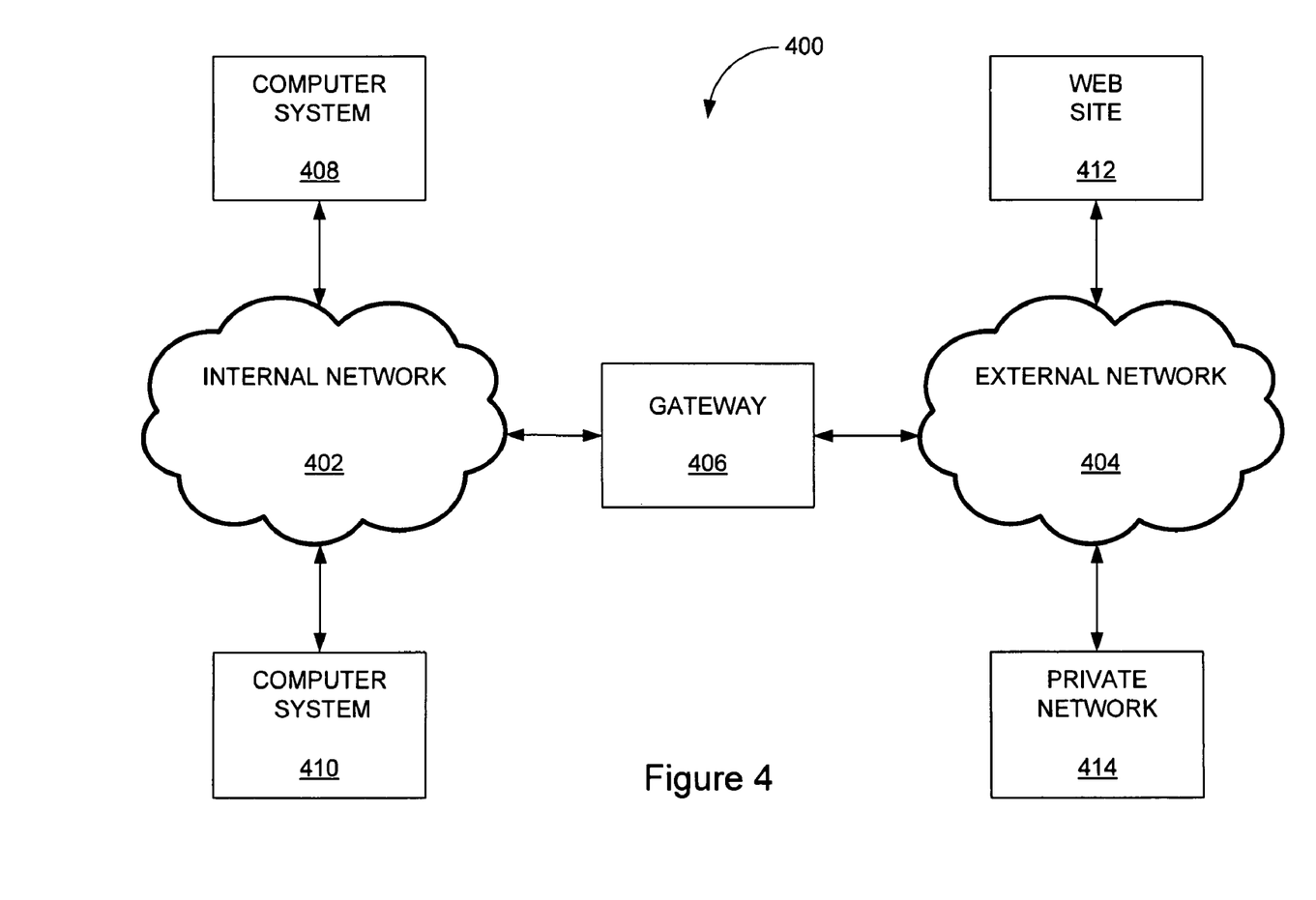
FIG. 4 is a block diagram illustrating a computer network and computer system configured for the identification of potential internet service customers.

FIG. 4 is a block diagram illustrating a computer network and computer system configured for the identification of potential internet service customers. In this example, the computer network includes internal network 402 connected to external network 404 through gateway 406. Computer system 408 and computer system 410 are connected to internal network 402. Web site 412 and private network 414 are connected to external network 404. In this example, internal network 402 and gateway 406 are operated by a first ISP, while external network 404 is operated by a second ISP. In some examples, internal network 402 corresponds to service provider network 106 from FIG. 1, while external network 404 corresponds to service provider network 108 from FIG. 1.

Figure 5:
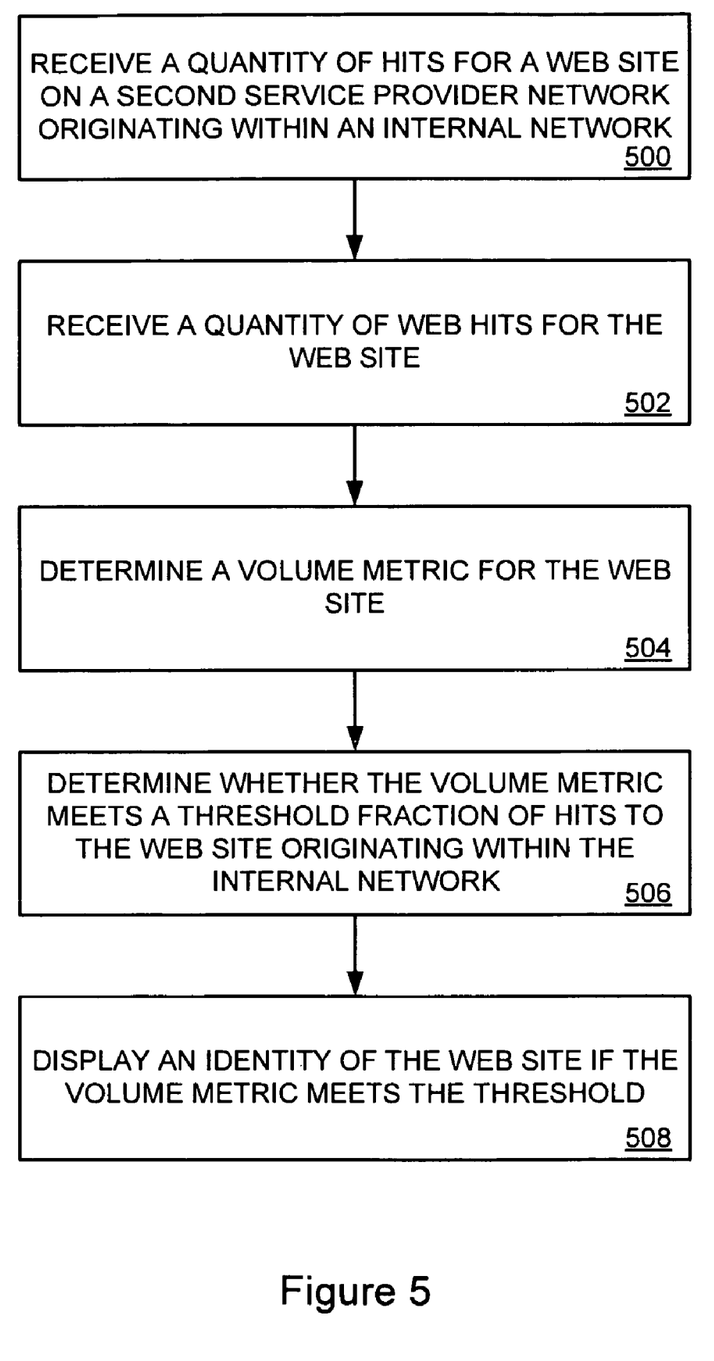
FIG. 5 is a flow chart illustrating a method for the identification of potential internet service customers.

FIG. 5 is a flow chart illustrating a method for the identification of potential internet service customers. Reference numbers from FIG. 5 are indicated parenthetically below. Computer system 408 receives a first internet traffic data corresponding to a quantity of hits for web site 412 originating within internal network 402 (operation 500). In some examples this first internet traffic data may be obtained by performing a deep packet inspection on IP packets traversing between internal network 402 and external network 404 through gateway 406. For example, second computer system 410 may access web site 412 through internal network 402 and this would count as one of the quantity of hits for web site 412 originating within internal network 402.

Computer system 408 also receives a second internet traffic data corresponding to a quantity of web hits for web site 412 (operation 502). As discussed above with respect to FIG. 2, this data may be obtained from any of a wide variety of public or private sources.

Computer system 408 determines a volume metric for web site 412 by dividing the first internet traffic data (corresponding to a quantity of hits for web site 412 originating within internal network 402) by the second internet traffic data (corresponding to a quantity of web hits for web site 412) (operation 504).

Computer system 408 then determines whether the volume metric determined in operation 504 meets a threshold fraction of hits to web site 412 originating within internal network 402 (operation 506). Finally, computer system 408 displays an identity of web site 412 if the volume metric meets or exceeds the threshold fraction of hits to web site 412 originating within internal network 402 (operation 508).

Figure 6:
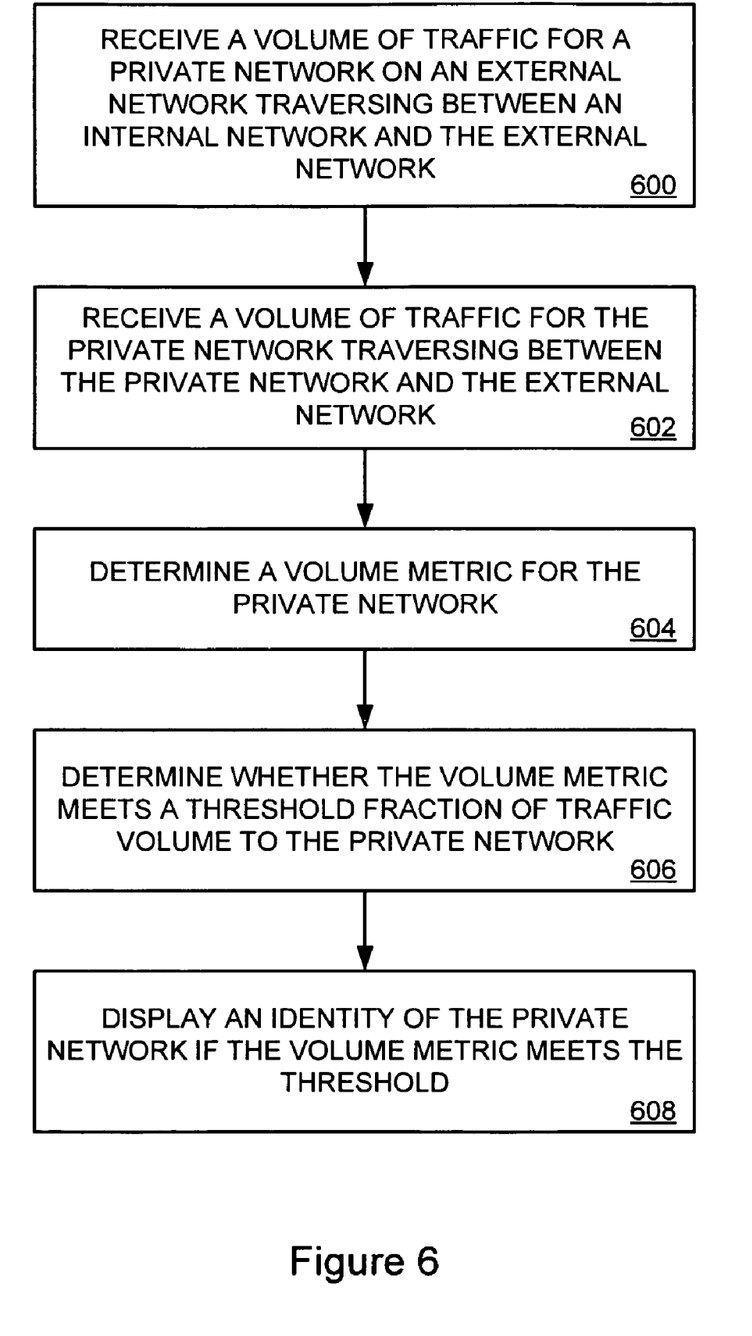
FIG. 6 is a flow chart illustrating a method for the identification of potential internet service customers.

FIG. 6 is a flow chart illustrating a method for the identification of potential internet service customers. Reference numbers from FIG. 6 are indicated parenthetically below. Computer system 408 receives a first internet traffic data corresponding to a volume of traffic for private network 414 on external network 404 traversing between internal network 402 and external network 404 (operation 600). In some examples this first internet traffic data may be obtained by performing a deep packet inspection on IP packets traversing between internal network 402 and external network 404 through gateway 406. For example, computer system 410 may send email to private network 414 through internal network 402 and this would count as some of the volume of traffic for private network 414 on external network 404 traversing between internal network 402 and external network 404.

Computer system 408 also receives a second internet traffic data corresponding to a volume of traffic for private network 414 traversing between private network 414 and external network 404 (operation 602). As discussed above with respect to FIG. 2, this data may be obtained from any of a wide variety of public or private sources.

Computer system 408 determines a volume metric for private network 414 by dividing the first internet traffic data (corresponding to a volume of traffic for private network 414 on external network 404 traversing between internal network 402 and external network 404) by the second internet traffic data (corresponding to a volume of traffic for private network 414 traversing between private network 414 and external network 404) (operation 604).

Computer system 408 then determines whether the volume metric determined in operation 604 meets or exceeds a threshold fraction of traffic volume to private network 414 traversing between internal network 402 and external network 404 (operation 606). Finally, computer system 408 displays an identity of private network 414 if the volume metric meets or exceeds the threshold fraction of traffic volume to private network 414 traversing between internal network 402 and external network 404 (operation 608).

It should be emphasized that the above-described embodiments are merely possible examples of implementations, merely set forth for a clear understanding of the principles of this disclosure. Many variations and modifications may be made to the above-described embodiments without departing substantially from the spirit and principles of the disclosure. All such modifications and variations are intended to be included herein within the scope of this disclosure.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of identifying potential internet service customers for a first service provider network, the method comprising:
    determining first internet traffic data for an internet entity corresponding to a first amount of internet traffic exchanged with the internet entity over the first service provider network based on deep packet inspection, wherein the internet traffic exchanged with the internet entity comprises packets destined to and transmitted from the internet entity;
    determining total internet traffic data for the internet entity corresponding to a total amount of internet traffic exchanged with the internet entity over a second service provider network that hosts the internet entity based on publically available internet traffic data;
    determining a volume metric for the internet entity based at least in part on the first internet traffic data and the total internet traffic data, wherein the volume metric represents how much of the total amount of internet traffic exchanged with the internet entity over the second service provider network is associated with the first service provider network;
    determining whether the volume metric meets a criterion; and
    displaying an identity of the internet entity if the volume metric meets the criterion.

2. The method of claim 1, wherein the internet entity comprises a web site on the second service provider network.

3. The method of claim 2, wherein the first internet traffic data is a quantity of hits destined for the web site originating within the first service provider network, and wherein the total internet traffic data is a total quantity of web hits to the web site.

4. The method of claim 3, wherein determining the volume metric comprises dividing the first internet traffic data by the total internet traffic data, and wherein the criterion comprises a threshold fraction of web hits to the web site originating within the first service provider network.

5. The method of claim 1, wherein determining the first internet traffic data based on deep packet inspection comprises inspecting internet protocol packets traversing a gateway between the first service provider network and the second service provider network.

6. The method of claim 1, wherein the internet entity comprises a private network on the second service provider network.

7. The method of claim 6, wherein the first internet traffic data comprises a volume of traffic traversing between the first service provider network and the second service provider network, and wherein the total internet traffic data comprises a total volume of traffic traversing between the private network and the second service provider network.

8. The method of claim 7, wherein determining the volume metric comprises dividing the first internet traffic data by the total internet traffic data, and wherein the criterion comprises a threshold fraction of traffic volume.

9. The method of claim 1, wherein the first service provider network comprises an internal network, and wherein the second service provider network comprises an external network.

10. A non-transitory computer-readable medium having instructions stored thereon for operating a computer system, wherein the instructions, when executed by the computer system, direct the computer system to:
  determine first internet traffic data for an internet entity corresponding to a first amount of internet traffic exchanged with the internet entity over a first service provider network based on deep packet inspection, wherein the internet traffic exchanged with the internet entity comprises packets destined to and transmitted from the internet entity;
  determine total internet traffic data for the internet entity corresponding to a total amount of internet traffic exchanged with the internet entity over a second service provider network that hosts the internet entity based on publicly available internet traffic data;
  determine a volume metric for the internet entity based at least in part on the first internet traffic data and the total internet traffic data, wherein the volume metric represents how much of the total amount of internet traffic exchanged with the internet entity over the second service provider network is associated with the first service provider network;
  determine whether the volume metric meets a criterion; and
  display an identity of the internet entity if the volume metric meets the criterion.

11. The non-transitory computer-readable medium of claim 10, wherein the internet entity comprises a web site on the second service provider network.

12. The non-transitory computer-readable medium of claim 11, wherein the first internet traffic data comprises a quantity of hits destined for the web site originating within the first service provider network, and wherein the total internet traffic data comprises a total quantity of web hits to the web site.

13. The non-transitory computer-readable medium of claim 12, wherein the instructions, to direct the computer system to determine the volume metric, direct the computer system to divide the first internet traffic data by the total internet traffic data, and wherein the criterion comprises a threshold fraction of web hits to the web site originating within the first service provider network.

14. The non-transitory computer-readable medium of claim 10, wherein the instructions, to direct the computer system to determine the first internet traffic data based on deep packet inspection, direct the computer system to inspect internet protocol packets traversing a gateway between the first service provider network and the second service provider network.

15. The non-transitory computer-readable medium of claim 10, wherein the internet entity comprises a private network on the second service provider network.

16. The non-transitory computer-readable medium of claim 15, wherein the first internet traffic data comprises a volume of traffic traversing between the first service provider network and the second service provider network, and wherein the total internet traffic data comprises a total volume of traffic traversing between the private network and the second service provider network.

17. The non-transitory computer-readable medium of claim 16, wherein the instructions, to direct the computer system to determine the volume metric, direct the computer system to divide the first internet traffic data by the total internet traffic data, and wherein the criterion comprises a threshold fraction of traffic volume.

18. The non-transitory computer-readable medium of claim 10, wherein the first service provider network comprises an internal network, and wherein the second service provider network comprises an external network.

19. A computer system comprising:
  a communication interface configured to receive internet traffic data; and
  a processing system coupled with the communication interface;
  wherein the processing system is configured to:
    determine first internet traffic data for an internet entity corresponding to a first amount of internet traffic exchanged with the internet entity over a first service provider network based on deep packet inspection, wherein the internet traffic exchanged with the internet entity comprises packets destined to and transmitted from the internet entity;
    determine total internet traffic data for the internet entity corresponding to a total amount of internet traffic exchanged with the internet entity over a second service provider network that hosts the internet entity based on publically available internet traffic data;
    determine a volume metric for the internet entity based at least in part on the first internet traffic data and the total internet traffic data, wherein the volume metric represents how much of the total amount of internet traffic exchanged with the internet entity over the second service provider network is associated with the first service provider network;
    determine whether the volume metric meets a criterion; and
    display an identity of the internet entity if the volume metric meets the criterion.

* * * * *